April 2, 1963  J. G. WRIGHT ETAL  3,083,368
WORK POSITIONING DEVICE
Filed Dec. 12, 1961  2 Sheets-Sheet 1

INVENTORS
JOHN G. WRIGHT &
BY ROY E. SMITH
Channing L. Richards
ATTORNEY

April 2, 1963
J. G. WRIGHT ETAL
3,083,368
WORK POSITIONING DEVICE
Filed Dec. 12, 1961
2 Sheets-Sheet 2
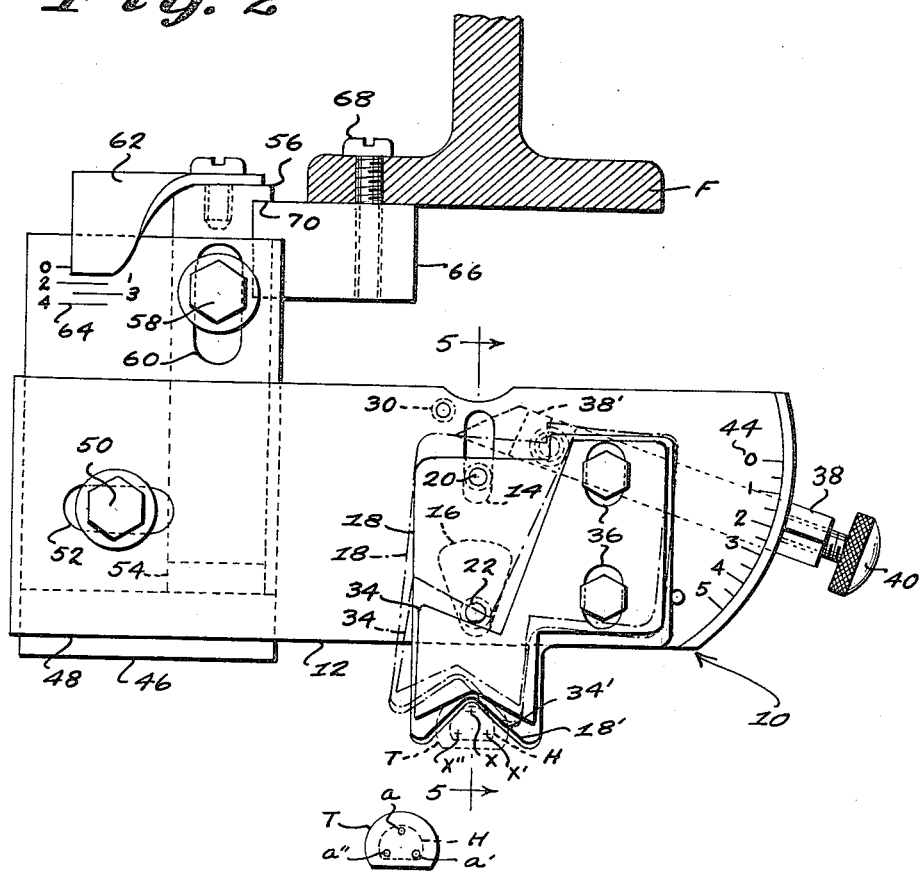
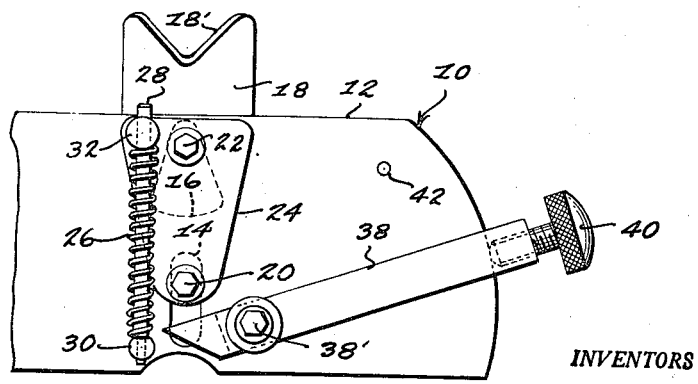
INVENTORS
JOHN G. WRIGHT &
BY ROY E. SMITH
Channing L. Richards
ATTORNEY

United States Patent Office 3,083,368
Patented Apr. 2, 1963

3,083,368
WORK POSITIONING DEVICE
John G. Wright and Roy E. Smith, Atlanta, Ga., assignors to The Auto-Soler Company, a corporation of Georgia
Filed Dec. 12, 1961, Ser. No. 158,784
7 Claims. (Cl. 1—19)

This invention relates generally to the positioning of work in relation to a machine so that it is located properly for having an operation performed thereon by the machine, and more especially to a work positioning device intended for such work location in instances where a repetitive machine operation is to be performed on work pieces of the same form in substantial lots, but where variants of the work piece form may be encountered from lot to lot.

Broadly considered, the work positioning device of the present invention is of the type disclosed and claimed in a prototype form by U.S. Patent No. 3,007,170, and in a substantially elaborated and improved form by application Serial No. 35,959, filed June 14, 1960, now U.S. Patent No. 3,017,635, although each of these previously patented devices is arranged particularly for use in shoe repair operations where the work being handled characteristically varies from piece to piece, whereas the device of the present invention is differently constituted for effective use in the manufacture of shoes where the same work piece is characteristically handled in production quantities.

The kind of work piece that may be positioned effectively by the device of this invention, as well as by the devices of the above noted prior patents under the circumstances to which they are suited, is exemplified by the heel of a ladies' shoe on which it is desired to attach a top lift with fasteners inserted by a fastener inserting machine; and an embodiment of the invention arranged for this purpose to satisfy uniquely the requirements of shoe manufacturing operations, in setting up with facility for a given production run and maintaining the setup adjustments consistently throughout the run, is described at length below in connection with the accompanying drawings, in which:

FIG. 2 is a top plan view of the work positioning device seen in FIG. 1;

FIG. 3 is a related plan detail indicating a desired fastener insertion pattern for a top lift such as is indicated in dotted lines at a located position in FIG. 2;

FIG. 4 is a fragmentary bottom plan detail corresponding to FIG. 2; and

Figure 1:
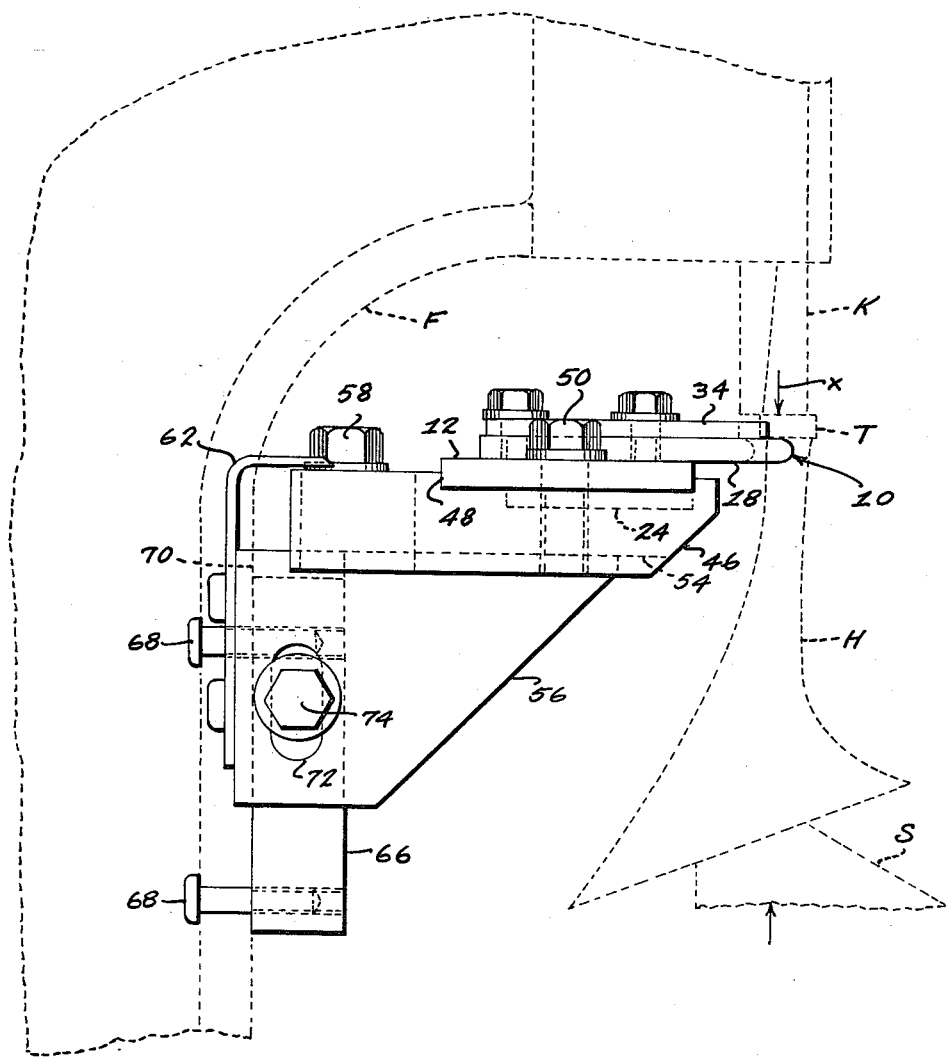
FIG. 1 is a side elevation of a work positioning device arranged according to the present invention, with a fragmentary dotted line indication of a fastener inserting machine carrying the device and a related dotted line illustration of a work piece being located thereby.

Referring now in detail to the drawings, FIG. 1 illustrates in dotted lines the immediately related portion of a fastening inserting machine frame F, such as is shown more fully in the above noted Patent No. 3,017,635, with a work positioning device embodying the present invention, as indicated generally by the reference numeral 10, mounted thereon for locating a heel block H in relation to the axis X at which fasteners are inserted from the fastener forming knife mechanism K of the machine to attach a top lift T, while the heel block H is rested for this purpose on a suitable work supporting means S.

As further illustrated in FIG. 2, the work positioning device 10 incorporates a base plate 12 in which an elongated slot 14 and a substantially triangular aperture 16 are formed in spaced axial alignment, with the apex of the triangular aperture 16 arranged remotely in relation to the slot 14 and facing toward the position at which work is positioned by the device 10. In the illustrated embodiment, the length of the slot 14 is shown as being equal to the extent of the aperture 16 between its apex and base, and the slot 14 should in any case have at least this length as will be apparent further below.

A work guiding member 18 is slidably disposed at the top face of the base plate 12 by means of first and second positioning studs 20 and 22 extending therefrom respectively through the previously noted slot 14 and aperture 16, and engaging a retainer plate 24 (see FIG. 4) at the opposite face of base plate 12 so that the work guiding member 18 is held thereon for relative shifting between a plurality of fastener locating positions determined by respective guided shifting of the positioning studs 20 and 22 in the base plate slot 14 and aperture 16.

Figure 5:
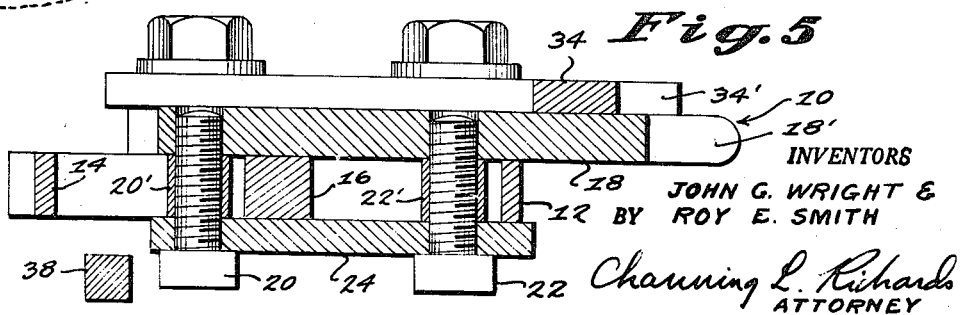
FIG. 5 is a section detail taken substantially at the line 5—5 in FIG. 2.

The spacing at which the positioning studs 20 and 22 extend from the work guiding member 18 is such as to allow shifting of the positioning stud 22 throughout the extent of the triangular aperture 16; although each positioning stud 20 and 22 is fitted with a bushing 20' and 22' (see FIG. 5) at the respective portions thereof that ride within the slot 14 and aperture 16, so as to facilitate the previously noted guided shifting therein and also to space the work guiding member 18 and retainer plate 24 in slidable relation on the base plate 12, and it should be further noted that both bushings 20' and 22' have a diameter corresponding to the width of the base plate slot 14, which exceeds the diametric width that would result from the radius at which the apex of the aperture 16 is formed, so that the bushing 22' is purposely prevented from seating fully at the aperture apex and is thereby always wedged by the converging sides of the triangular aperture 16 to hold the work guiding member 18 firmly against lateral play at its extended position which is determined in relation to the aperture apex when the bushing 22' is disposed adjacently.

Normally, the work guiding member 18 is held at this extended position under the bias of a compression spring 26 (see FIG. 4) that is arranged on a guide rod 28 to act between an anchor pin 30, that is carried by the base plate 12 at a fixed axis to support and hold the guide rod 28 at one end while allowing it a necessary swinging motion, and a guide pin 32, that is carried by the retainer plate 24 and through which the other end of the guide rod 28 slidably extends. At this normal extended position, the work guiding member 18 is positioned, as indicated in FIG. 2, to locate a heel block H and a top lift T for having a first attaching fastener a (see FIG. 3) driven at the fastener insertion axis X; it being noted that the extending portion of the work guiding member 18 is notched, as seen at 18', to effect such location upon the heel block H being presented manually thereat. Also, for similarly but differentially locating the top lift T, which characteristically has an oversize form at the attaching stage, the work guiding member 18 is additionally fitted with a supplementary guide element 34 that has a correspondingly notched locating portion 34', and that has elongated slots 36 formed therein to allow settable adjustment of the relation at which it is attached on the work guiding member 18 in accordance with the differential shape of the top lift T that is to be additionally located.

To complete the insertion of a desired fastener pattern including, for example, the further attaching fasteners a' and a" in an arrangement such as is represented in FIG. 3, an increased manual pressure is exerted on the work so as to overcome the biasing force of the spring 26 and shift the work guiding member 18 backwardly while at the same time causing it to retract toward one side or the other of its extended position under the guidance of one or the other converging triangular sides of the base plate aperture 16. When this is done, the work guiding member 18 is made to assume a displaced position, such as is illustrated by broken lines in FIG. 2, at which a fastener location X' (see FIG. 2) for a second attaching fastener a' of the desired pattern (see FIG. 3) is made to coincide with the fastener insertion axis X, and similar manipulation in relation to the opposite side of the base plate aperture 16 will determine a further fastener location X" for the remaining attaching fastener a" of the indicated FIG. 3 pattern.

The extent of such displacement of the work guiding member 18 is selectively limited in relation to the fastener pattern desired by a lever 38 (see FIGS. 2 and 4) that is pivoted on the base plate 12 intermediate its length, as at 38', so as to disposed one end thereof in the path of the guided shifting which takes place during this displacement, and that has its other end fitted with a lock screw 40 by which the base plate 12 may be engaged to hold the lever 38 in fixed relation thereon at any selected position within its pivoting range. This range of lever pivoting is determined at one extreme by limiting abutment at the normal extended position of the work guiding member 18, in which case no retracting displacement would be allowed, and at the other extreme by a stop pin 42 fixed in the base plate 12 to limit the lever pivoting at the greatest extent of retracting displacement provided for; a suitable scale, as at 44, being scribed on the base plate 12 for setting the lever 38 between these two extremes in correspondence with the particular size of the fastener pattern desired.

The manner in which the work positioning device 10 is arranged for mounting on the machine frame F provides additionally for complete settable adjustment of the device readily in relation to the axis X at which the attaching fasteners are inserted. For this purpose, the base plate 12 is carried directly by a first support block 46 that is slotted, as seen at 48 in FIG. 1, to hold base plate 12 for sliding adjustment thereon sidewise of the axis on which the base plate slot 14 and aperture 16 are aligned, and that receives a securing screw 50 through an elongated slot 52 in the base plate 12 to allow setting of the work guiding member 18 in proper sidewise alignment with the fastener insertion axis X.

This first support block 46 is also slotted at its bottom face, as indicated at 54 in FIG. 1, to ride for sliding adjustment in the direction of the base plate slot 14 and aperture 16 alignment on a second support block 56 that receives a second securing screw 58 through an elongated slot 60 in the first support block 46 to provide for setting the work guiding member 18 at a proper spacing in relation to the fastener inserting axis X so that the fastener inserting pattern may be set for location backwardly or forwardly as is best suited to the particular shape of the work; a gauging arm 62 being mounted on the second support block 56 to extend in relation to a scale 64 (see FIG. 2) on the first support block 46 as a guide for making this setting.

Finally, a third support block 66 is provided that is attached directly to the machine frame F by screws 68 so as to dispose the base plate 12 in a plane perpendicular to the fastener insertion axis X, with the second support block 56 slotted at 70 so as to be carried thereon for sliding adjustment in the direction of the axis X and formed with an elongated slot 72 through which a securing screw 74 extends for fixing the work supporting device 10 in place at a spacing in relation to the fastener inserting knife assembly K that allows handling of the work for positioning thereat to the best advantage.

The present invention has been described in detail above for purposes of illustration only and is not intended to be limited by this description or otherwise except as defined in the appended claims.

We claim:
1. A work positioning device for locating fasteners inserted by a fastener inserting machine, said device comprising a base plate mounted on said machine, a work guiding member carried on said base plate for relative movement between a plurality of fastener locating positions, means carried by said base plate for selectively limiting the extent of said relative movement of the work guiding member, and means for adjusting the mounted position of said base plate on said machine axially of said relative movement of the work guiding member and thereby selectively positioning the extent of said relative movement with respect to said machine.

2. A work positioning device for locating fasteners in a desired pattern upon insertion by a fastener inserting machine, said device comprising a base plate mounted on said machine, a work guiding member carried on said base plate for relative movement corresponding to the pattern desired for locating said fasteners, and respective means for adjusting the mounted position of said base plate on said machine both axially and sidewise of said relative movement of the work guiding member and thereby selectively positioning said desired pattern with respect to said machine.

3. A work positioning device for locating a plurality of fasteners in a desired pattern upon insertion by a fastener inserting machine, said device comprising a base plate, a work guiding member slidably disposed at one face of said base plate and held thereon for relative shifting between a plurality of fastener locating positions corresponding to the pattern in which it is desired to locate said fasteners, and means for mounting said base plate on said machine in relation to the axis at which fasteners are inserted thereby, said last mentioned means including a first support block carrying said base plate for settable adjustment sidewise of the axis on which said relative shifting takes place, a second support block carrying said first support block for settable adjustment in the direction of said relative shifting axis, and a third support block carrying said second support block and adapted for attachment on said machine so as to dispose said base plate in a plane perpendicular to said fastener insertion axis with said work guiding member located adjacent said fastener insertion axis and with said second support block settably adjustable in the direction of said fastener insertion axis.

4. A work positioning device for locating a plurality of fasteners in a desired pattern upon insertion by a fastener inserting machine, said device comprising a base plate, a work guiding member slidably disposed at one face of said base plate and held thereon for relative shifting between a plurality of fastener locating positions corresponding to the pattern in which it is desired to locate said fasteners, means carried by said base plate for selectively limiting the extent of said relative shifting of said work guiding members thereon, and means for mounting said base plate on said machine in relation to the axis at which fasteners are inserted thereby, said last mentioned means including a first support block carrying said base plate for settable adjustment sidewise of the axis on which said relative shifting takes place, a second support block carrying said first support block for settable adjustment in the direction of said relative shifting axis, and a third support block carrying said second support block and adapted for attachment on said machine so as to dispose said base plate in a plane perpendicular to said fastener insertion axis with said work guiding member located adjacent said fastener insertion axis and with said second support block settably adjustable in the direction of said fastener insertion axis.

5. A work positioning device as defined in claim 4 and further characterized in that said means for selectively limiting the extent of said relative shifting of said work guiding member comprises a lever pivoted on said base plate intermediate its length to dispose one end thereof in the path of said relative shifting and having the other end thereof settable in fixed relation with said base plate at a selected position in the range of lever pivoting provided on said base plate.

6. A work positioning device for locating fasteners inserted by a fastener inserting machine, said device comprising a base plate having an elongated slot and a substantially triangular aperture formed therein in spaced axial alignment with the apex of said triangular aperture arranged remotely in relation to said slot and with the length of said slot being at least as great as the extent of said apex from the aperture base, a work guiding member slidably disposed at one face of said base plate and fitted with first and second positioning studs extending therefrom respectively through said slot and aperture for guided shifting therein, the spacing of said positioning studs being such as to allow shifting of said second stud throughout the extent of said aperture, a retainer plate engaged by said positioning studs at the opposite face of said base plate so that said work guiding member is held on said base plate for relative shifting thereon between a plurality of fastener locating positions determined by the respective guided shifting of said positioning studs in said slot and aperture, means biasing said work guiding means toward a normal position on said base plate at which said second positioning stud is located adjacent the apex of said triangle, means carried by said base plate for selectively limiting the extent of relative shifting of said work guiding member thereon from said normal position, and means for mounting said base plate on said machine in relation to the axis at which fasteners are inserted thereby, said last mentioned means including a first support block carrying said base plate for settable adjustment sidewise of the axial alignment of said slot and aperture therein, a second support block carrying said first support block for settable adjustment in the direction of said slot and aperture alignment, and a third support block carrying said second support block and adapted for attachment on said machine so as to dispose said base plate in a plane perpendicular to said fastener insertion axis with said work guiding member located adjacent said axis and with said second support block settably adjustable in the direction of said axis.

7. A work positioning device as defined in claim 6 and further characterized in that said work guiding member is additionally fitted with a supplementary guide element that is settably adjustable thereon for locating a second work piece differentially in relation to a first work piece located by said work guide member and to which said second work piece is to be attached by fasteners inserted by said machine.

References Cited in the file of this patent
UNITED STATES PATENTS

| | | |
|---|---|---|
| 1,716,591 | Mackenzie | June 11, 1929 |
| 3,017,635 | Wright | Jan. 23, 1962 |